June 11, 1957     C. S. GRIMSHAW     2,795,674

CONDITION RESPONSIVE ELECTRIC SWITCH MECHANISM

Filed Aug. 24, 1954

*INVENTOR.*
CHARLES S. GRIMSHAW
BY

HIS ATTORNEY

United States Patent Office 2,795,674
Patented June 11, 1957

2,795,674

CONDITION RESPONSIVE ELECTRIC SWITCH MECHANISM

Charles S. Grimshaw, Fulton, Ill., assignor to General Electric Company, a corporation of New York Application August 24, 1954, Serial No. 451,910

2 Claims. (Cl. 200—140)

This invention relates to electric switch mechanisms and, more particularly, to mechanisms of the type which are actuated by an external condition such as temperature or pressure.

In many machines, such as household refrigerators, it is customary to provide a switch which will automatically start the machine in response to a first predetermined condition, such as a predetermined maximum temperature in the refrigerator, and which will subsequently stop the machine in response to a second predetermined condition, such as a predetermined minimum temperature in the refrigerator. The condition response element in these switches is conventionally a pressure responsive expansible bellows which in turn is connected to a temperature responsive bulb that varies the pressure in the bellows responsive to the change in ambient temperature in the region of the bulb.

As indicated above, this switch, while it has more general application, is very useful in the control of a refrigerator. It will be understood that in the operation of a refrigerator, only a relatively small amount of frost accumulates on the evaporating unit during each operating cycle of the machine and, therefore, the objectionable periodic defrosting of the refrigerator could be eliminated if the frost accumulated during each cycle were removed after each cooling cycle and prior to the initiation of the next cycle. This defrosting of the evaporating unit after each cooling cycle may be accomplished by initiating operation of the refrigerator at a constant preset temperature several degrees above freezing, for example 37½° F. Thus, the frost which accumulates during each cooling cycle will be melted off after each cycle since the temperature of the evaporating unit will be permitted to rise sufficiently high to melt the frost prior to restarting of the compressor unit. With such an arrangement, however, it will be necessary to provide for manual adjustment of the lower temperature at which the compressor unit is turned off in order to control the average ambient temperature in the refrigerator. This control is well adapted to effect the foregoing control of a refrigerator.

A primary object of the present invention is to provide an improved condition responsive electric switch that closes in response to a first predetermined condition and opens in response to a second predetermined condition with the switch including an adjusting means to determine the second predetermined condition.

Another object of this invention is to provide a device that will control the compressor motor of a refrigerating system of a household refrigerator.

Further objects and advantages of the invention will become apparent as the following description proceeds and the features of novelty which characterize the invention will be pointed out with particularly in the claims annexed to and forming a part of this specification.

In accordance with this invention, there is provided a condition control device including a responsive member adapted to expand and contract in response to predetermined conditions. A pair of contacts is provided to control an electric current that regulates the conditions. Means movable by the expansion and contraction of the responsive member close the contacts at a first predetermined condition and open the contacts at a second predetermined condition. Other suitable means are provided to vary the second predetermined condition at which the contacts open by varying the position of one of the contacts.

For a better understanding of the invention reference may be had to the accompanying drawing, in which.

Figure 1:
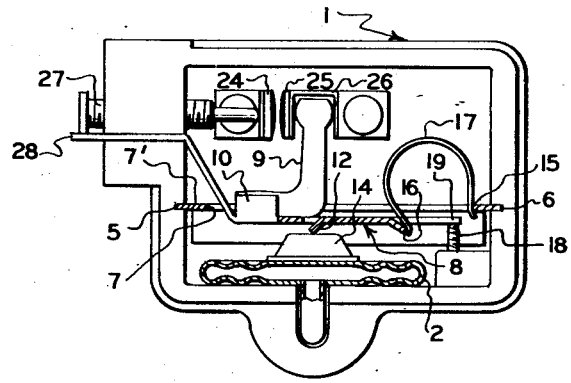
Fig. 1 is a view partly in section of a control embodying the present invention.

Referring to the drawing, there is shown a casing or support 1 preferably made of an electrically insulating molding composition. An expansible metallic bellows 2 is disposed in the bottom of the casing 1 and is connected to a fluid conduit or line 3. The bellows is supported by bending the line 3 in a passage 3' in casing 1. The line 3 work hardens and partially flattens in bending and securely holds bellows 2 in its desired position. A small amount of cement or other suitable sealing material is placed around the line 3 to fill the voids in passage 3' and keep motion of the line from being transmitted to the bellows 2. The bellows is connected by the line 3 to a thermostatic bulb (not shown). It will be understood that the bulb is partially filled with a volatile fluid whose vapor pressure will vary in response to changes in the temperature at the control point where the bulb is located. When the device is employed in a refrigerator to control the compressor motor, for example, the thermostatic bulb is preferably clamped to the evaporator near the outlet tube, which is the coldest point and where the last frost or ice melts. Thus, by suitably selecting the maximum temperature of operation for this device it will permit all ice and frost to melt from the evaporator before the compressor motor is energized.

A base plate 4 is mounted in the casing 1 by having two of its edges disposed in notches 5 and 6 in the casing 1. The base plate 4 has flanges 4' extending downwardly from the two edges not disposed in the notches 5 and 6. The base plate 4 has an opening 7 of a much larger size than the rim width 7' of the base plate. A member 8 has knife edges 11 that permit the member 8 to be pivotally mounted in the flanges 4' of the base plate 4. This member 8 has an electrically insulating arm 9 extending upwardly through the opening 7 (see Fig. 1). This arm 9 is secured to the member 8 by any suitable means though the preferred method is to place a small amount of cement on the lower portion of the arm 9, on the sides thereof, and press the bent portions 10 of the member 8 against arm 9. A portion 12 is formed from the member 8 and extends downwardly therefrom to cause the member 8 to be moved about its knife edges 11 by the bellows 2. The bellows 2 includes an extension 14, which cooperates with the portion 12 to pivot the member 8 about the knife edges 11.

Figure 2:
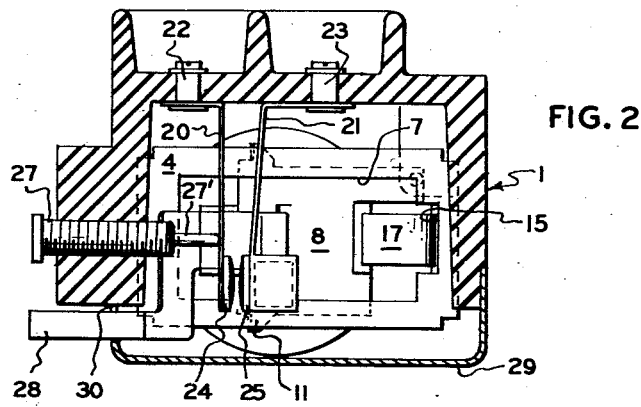
Fig. 2 is a plan view partly in section of Fig. 1.
Figure 3:
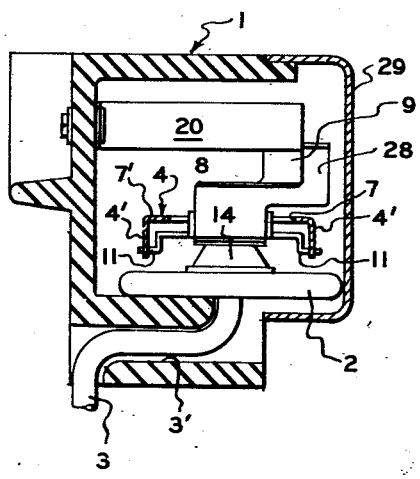
Fig. 3 is an elevational view partly in section of Fig. 1.

A knife edge 15 is provided along one edge of the base plate 4. This knife edge is formed by removing a portion of the base plate 4 (see Fig. 2). A similar knife edge 16 is provided at one edge of the movable member 8. A non-overcenter toggle spring 17 is disposed between the two knife edges to urge the member 8 clockwise around its pivot point on knife edges 11. A screw 18 is mounted on the bottom wall of the casing 1 to cooperate with an extension 19 of movable member 8 to limit clockwise movement of member 8 about its knife edges 11.

A pair of flexible members or fingers 20 and 21 are secured to the back wall of the casing 1 by electrically conducting studs 22 and 23, respectively. The studs 22 and 23 are connected to the leads of a device to be controlled, for example a compressor motor of a refrigerating system of a household refrigerator. A contact 24 is mounted on the end of the flexible finger 20 and a contact 25 is mounted on the end of the flexible finger 21 to cooperate with each other whereby the closing of contacts 24 and 25 energizes the compressor motor. A U-shaped bracket 26 is secured to the flexible finger 21 on the side opposite the contact 25. This U-shaped bracket is adapted to fit over the end of the arm 9, as shown in Fig. 1, so that movement of the arm 9 will open and close the contacts 24 and 25.

An adjusting screw 27 is disposed in a side wall of the casing 1 and has an insulating portion 27' that coacts with the flexible finger 20 to adjust the position of the contact 24. The flexible finger 20 is resiliently biased into contact with the portion 27' at all times. The counterclockwise rotation of member 8 is limited by adjusting screw 27 through contacts 24 and 25 and arm 9, which is rigidly attached to member 8. The member 8 includes a second arm 28 that pivotally moves the member 8 from outside the casing 1. This arm 28 provides a manual "off" or contacts open position when it is desired to shut down the machine. A cover 29 is provided to form the front wall of the casing 1 and has an opening 30 through which a second arm 28 extends. A single control knob may be employed to rotate the adjusting screw 27 and to actuate the second arm 28. This single control knob is not shown since it is not a part of the present invention.

Considering the operation of the present invention, the bellows 2 expands when, for example, the fresh food evaporator of a refrigerator warms up. This causes the member 8 to pivot counterclockwise about its knife edges 11 as a result of engagement of the portion 12 of the member 8 by extension 14 of bellows 2. The bellows 2 tends to expand upwardly as the vapor pressure increases, but the upward expansion of the bellows 2 is limited by the downward component of force of the toggle spring 17, which is acting against the knife edge 16 of member 8. As the member 8 is rotated counterclockwise by the expansion of the bellows 2, it moves the non-overcenter toggle spring 17 towards its "dead center" axis whereby the downward component of the toggle spring force opposing the upward force of the bellows is progressively decreased to produce a snapping action of the member 8. This snap action is imparted to the arm 9, which engages the U-shaped bracket 26 to bring contact 25 into engagement with the contact 24. The snap action of the member 8 always occurs at the same pressure in the bellows as the same force is always required to overcome the component of force exerted by the toggle spring; accordingly, the contacts 24 and 25 are closed at the same "on" temperature. The maximum counterclockwise movement of the member 8 will be when the contact 24 has been moved to the extreme left, as viewed in Fig. 2, by the adjusting screw 27. It will be noted that as the downward force of the toggle spring 17 is reduced, the bellows 2 tends to move to its completely expanded position to aid in the snapping action; however, the bellows 2 reaches its completely expanded position only when contact 24 has been moved to the extreme left, as viewed in Fig. 2. The bellows always exerts a positive force in the counterclockwise direction because a vapor is selected which has greater than atmospheric pressure at the lowest "off" temperature. The adjusting screw 27 is set so at the maximum counterclockwise rotation of member 8 the toggle spring is far enough in the clockwise direction from "dead center" to still exert a slight downward force. It will be understood that the studs 22 and 23 are connected to the leads of a compressor motor of a refrigerating system of a household refrigerator, for example, so that closing of contacts 24 and 25 energizes the compressor motor.

As the compartment and evaporator become colder, the bellows 2 contracts due to a decreased pressure and thereby moves downwardly. The extension 14 of bellows 2 reduces its force on portion 12 of member 8 whereby toggle spring 17 due to the slight downward component of force while in this position causes member 8 to pivot about the knife edges 11 in a clockwise direction as seen in Fig. 1, which movement is limited by screw 18. As the member 8 rotates clockwise due to a contraction of the bellows, there is a rapid increase in the downward component of force of the non-overcenter toggle spring so that the combustion of this increasing downward component of the toggle force and the contraction of the bellows cause the member 8 to snap to its initial position. This snap action of the member 8 results in the arm 9 moving the contact 25 away from the contact 24 through the U-shaped bracket 26 to break the circuit for the compressor motor to stop refrigeration.

It will be noted that the member 8 always starts from the screw 18 when moved by the bellows 2 expanding due to an increasing pressure therein. Since the screw 18 is fixed in position, the member 8 and therefore the contact 25, which is actuated by the member 8 through the arm 9, move from the open to closed position at the same pressure and therefore temperature. This, of course, causes the "on" temperature of the control to be fixed.

When the pressure decreases in the bellows 2, the member 8 snaps from a position determined by the adjusting screw 27, which supports the contact 24 on the flexible finger 20. This provides a stop for the upper end of arm 9, which is securely attached to the member 8. As the starting position of the member 8 is varied due to the adjusting screw 27 being rotated to change the position of the contact 24, the initial downward component of force due to the toggle spring 17 is also varied. This causes the member 8 to snap to its open position at varied pressures in the bellows 2 depending upon the position of the adjusting screw 27. Thus, the downward component of force due to the toggle spring 17, at the time that the pressure in the bellows 2 starts to reduce, is greatest when the contact 24 is in its extreme right position, as viewed in Fig. 2, and smallest when the contact 24 is in its extreme left position. Therefore, the required downward force necessary to overcome the decreasing force exerted by the bellows, and thereby snap the member 8 to open the contacts, is reached quickest when the contact 24 is in its extreme right position and slowest when the contact 24 is in its extreme left position. This results in the highest "off" temperature being reached by setting the contact 24 in its extreme right position and the lowest "off" temperature occurring by moving the contact 24 to its extreme left position. Therefore, the adjusting screw 27 varies only the "off" temperature.

For use of this invention in a refrigerator, a constant "on" temperature may be selected at 37½° F. to insure that all ice and frost will melt from the evaporator before the compressor motor is energized to start refrigeration. The temperature of the food storage compartment may be varied by changing the position of the screw 27, which, of course, alters the location of the contact 24.

It will be seen that this invention provides an improved and simple condition responsive switch that automatically opens its contacts in response to a lower predetermined condition and automatically closes the contacts in response to an upper predetermined condition, the lower condition at which the contacts open being adjustable while the upper condition is constant. This invention has a particular advantage of insuring defrosting of the refrigerator cabinet by maintaining a constant maximum temperature, which is sufficient to melt any frost or ice, while permitting variation of the refrigerating effect by altering the minimum temperature at which refrigeration is stopped.

While the present invention has been described by reference to a particular embodiment thereof, it will be understood that modifications may be made by those skilled in the art without actually departing from the invention. Therefore, the appended claims are intended to cover all such variations as come within the true spirit and scope of the invention.

What I claim as new and desire to secure by Letters Patent of the United States is:

1. A condition responsive electrical switch comprising a support, a stationary contact mounted on said support, a movable contact mounted on said support cooperating with said stationary contact, said movable contact normally being spaced from said stationary contact, means pivotally mounted on said support for movement between a first position and a second position, said means in its second position moving said movable contact to close said contacts, spring means continuously biasing said pivotal means around its pivot point in the same direction towards its first position thereby to open said contacts, said spring means exerting a rapidly diminishing component of force against said pivotal means as said pivotal means is moved from said first to said second position, an element movable in response to a variable external condition arranged to exert an opposing force upon said pivotal means to overcome said component of force exerted by said spring means upon said pivotal means while in said first position thereby to close said contacts in response to a first predetermined external condition, said opposing force of said element in response a second predetermined external condition dropping below said component of force of said spring means exerted upon said pivotal means while in said second position thereby to open said contacts, and adjusting means to vary the position of said stationary contact and thereby to also vary said second position of said pivotal means to regulate the component of force exerted thereon by said spring means whereby said second predetermined condition to open said contacts is determined.

2. A condition response electrical switch comprising a support, a bellows mounted on said support, a stationary contact mounted on said support, a movable contact mounted on said support cooperating with said stationary contact, said movable contact normally being spaced from said stationary contact, a base plate mounted above said bellows, said base plate having an opening therein, a member pivotally mounted on said base plate, an arm extending from said member through said opening in said base plate for movement between a first position and a second position, said arm engaging said movable contact to move said movable contact to close said contacts when said arm is in its second position, a toggle spring disposed between said member and said base plate and continuously biasing said arm toward its first position thereby to open said contacts, said toggle spring arranged to exert a rapidly diminishing component of force against said pivotal member as said arm is moved from said first to said second position, said bellows being movable in response to a variable external condition arranged to overcome said component of force exerted by said toggle spring when said arm is in said first position thereby to move said arm to said second position and close said contacts in response to a first predetermined external condition, said force of said bellows in response to a second predetermined external condition dropping below said component of force of said toggle spring exerted upon said pivotal element when said arm is in said second position thereby to move said arm to said first position and open said contacts, and adjusting means to vary the position of said stationary contact and thereby to also vary said second position of said arm and said pivotal means to regulate said component of force exerted thereon by said toggle spring whereby said second predetermined condition to open said contacts is determined.

References Cited in the file of this patent
UNITED STATES PATENTS

| | | |
|---|---|---|
| 2,240,373 | Newton | Apr. 29, 1941 |
| 2,389,436 | Kearney | Nov. 20, 1945 |
| 2,623,963 | Wolfe et al. | Dec. 30, 1952 |
| 2,651,692 | Slonneger | Sept. 8, 1953 |
| 2,729,720 | Jacobs | Jan. 3, 1956 |
| 2,755,362 | Jacobs | July 17, 1956 |